Patented June 2, 1925.

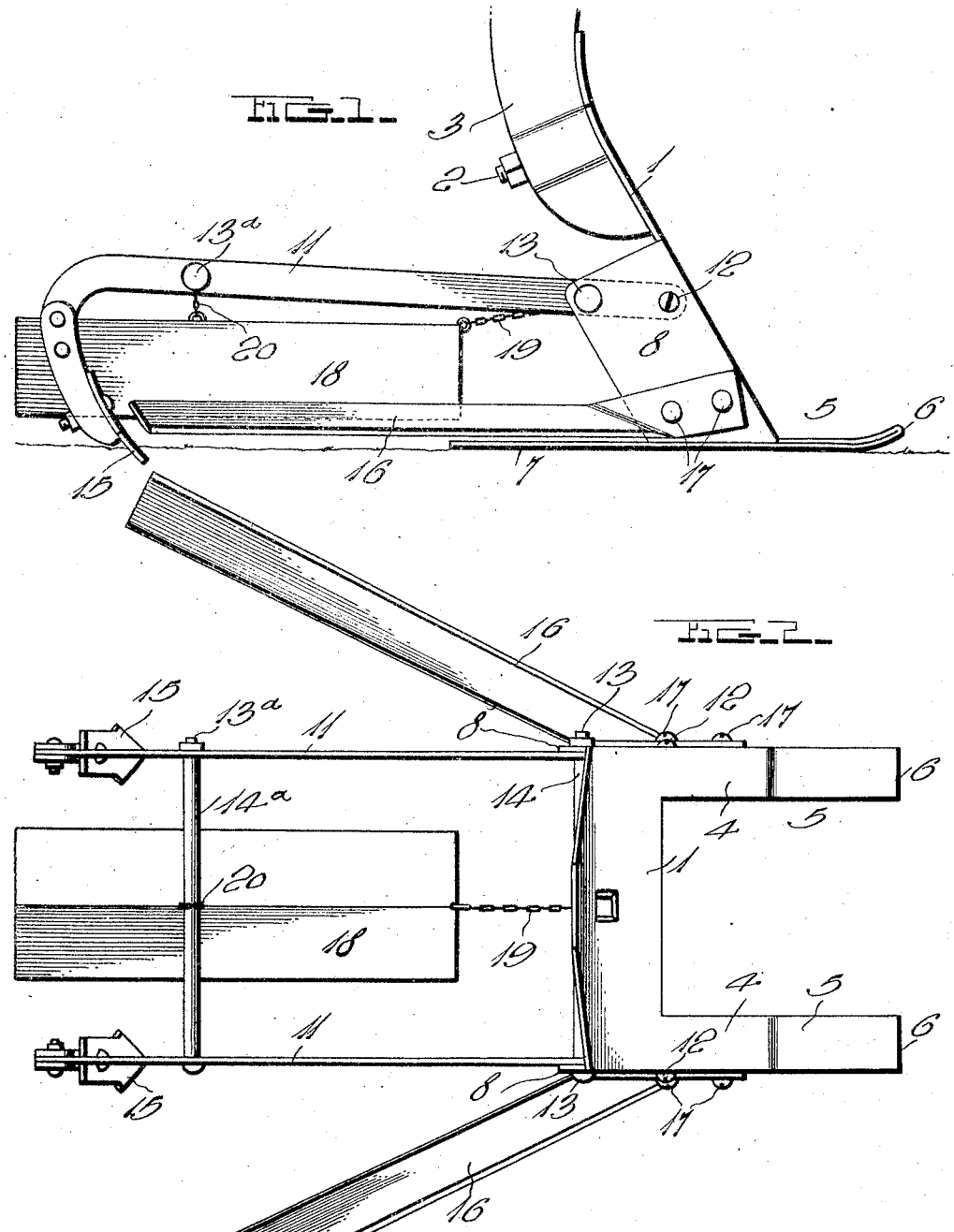

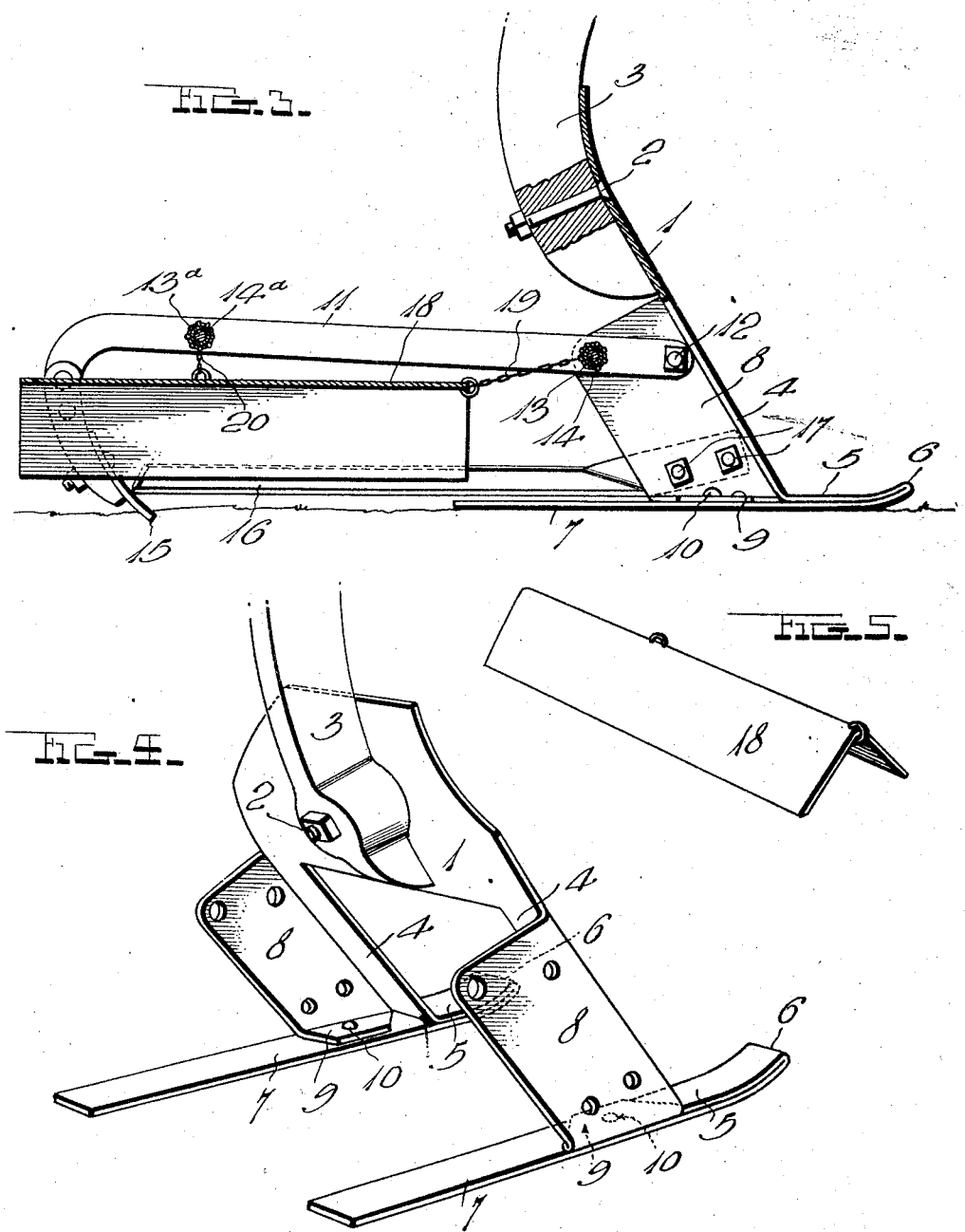

1,540,100

UNITED STATES PATENT OFFICE.

MARSHAL S. CARTER, OF WICHITA FALLS, TEXAS.

COMBINED WEEDER AND CULTIVATOR.

Application filed April 10, 1924. Serial No. 705,590.

*To all whom it may concern:*

Be it known that I, MARSHAL S. CARTER, a citizen of the United States, residing at Wichita Falls, in the county of Wichita and State of Texas, have invented certain new and useful Improvements in Combined Weeders and Cultivators; and I do declare the following to be a full, clear, and exact description of the invention, such as will enable others skilled in the art to which it appertains to make and use the same.

My invention aims to provide an extremely simple and inexpensive device which may be effectively used for simultaneously cultivating along opposite sides of a row of small plants or the like, and for cutting weeds also at opposite sides of the row.

With the foregoing in view, the invention resides in the novel subject matter herein after described and claimed, the description being supplemented by the accompanying drawings.

Figure 1 is a side elevation of the invention.

Figure 2 is a plan view thereof.

Figure 3 is a longitudinal sectional view.

Figure 4 is a perspective view with the cultivating and weeding means detached.

Figure 5 is a perspective view of a fender which is preferably used.

In the drawings above briefly described, the numeral 1 designates an arched plate which is adapted to be connected by the usual bolt 2, to one of the usual cultivator beams 3. The legs 4 of the plate 1 are adapted to straddle a row being cultivated, and in the preferred form of construction, the lower ends of these legs 4 are bent forwardly as indicated at 5, turned upwardly to some extent as shown at 6, and are then bent horizontally rearward and extended behind the plate 1, to provide a pair of runners 7. Vertical flanges 8 are preferably formed integrally with the outer edges of the upright portions of the arms 4, said flanges being extended rearwardly and preferably having their lower ends bent inwardly at 9 and secured by rivets or the like 10 to the runners 7. Thus, the vertical portions of the arms 4 and the runners 7 are relatively braced, and at the same time, the flanges 8 form attaching means for a pair of supplemental cultivator beams 11. The front ends of these beams have been shown secured to the flanges 8 by bolts 12 and 13, the bolts 12 being short, while the bolt 13 preferably extends from one flange 8 to the other and carries a spacing sleeve 14 whose ends abut the beams 11. Near their rear ends, the beams 11 are preferably connected by a second long bolt 13$^a$ which carries a spacing sleeve 14$^a$ for said beams, and behind these parts 13$^a$ and 14$^a$, the beams turn downwardly and carry appropriate cultivator shovels 15.

In addition to performing the functions above set forth, the flanges 8 carry a pair of rearwardly diverging weed cutting blades 16 whose front ends are secured thereto by bolts or the like 17.

Preferably, an arched fender 18 is interposed between the beams 11 to straddle a small row being cultivated, preventing the shovels 15 from throwing earth onto said row. This fender may be mounted in any desired manner, but I have shown it connected by chains 19 and 20 with the sleeves 14 and 14$^a$.

In operation, the arched plate 1 straddles the row, the cultivator shovels 15 work the earth along both sides of said row, and at the same time, the blades 16 cut all weeds and grass along the sides of the row. Thus, at a single operation, a row of plants may be effectively worked and weeded.

Excellent results have been obtained from the details disclosed, and they may therefore be followed, but within the scope of the invention as claimed, numerous minor changes may be made.

I claim:

1. A device of the class described comprising an arched plate adapted to be secured to a cultivator beam, a pair of horizontal runners to which the legs of said arched plate are secured at their lower ends, supplemental cultivator beams extending rearwardly from said plate and adapted to carry cultivator shovels, and rearwardly diverging weed cutting blades extending rearwardly from the legs of said arched plate.

2. A device of the class described comprising an arched plate adapted to be secured to a cultivator beam, horizontal runners to which the legs of said plate are secured at their lower ends, rearwardly extending flanges on said legs, said flanges being secured at their lower ends to said runners to brace the latter with respect to the plate, and earth-working means secured to and extending rearwardly from said flanges.

3. A device of the class described comprising an arched plate adapted to be secured to a cultivator beam, the legs of said plate having their lower ends extended forwardly and upwardly and then bent upon themselves and extended rearwardly beyond the upper portions of said legs, said upper portions of the legs having rearwardly extended flanges secured at their lower ends to said rearwardly extending leg portions to brace the latter with respect to the remainder of said arched plate, and means secured to said flanges for working the earth along opposite sides of a row straddled by said plate.

In testimony whereof I have hereunto affixed my signature.

MARSHAL S. CARTER.